R. E. ADAMS.
GRATE.
APPLICATION FILED FEB. 23, 1909.
928,921.
Patented July 27, 1909.
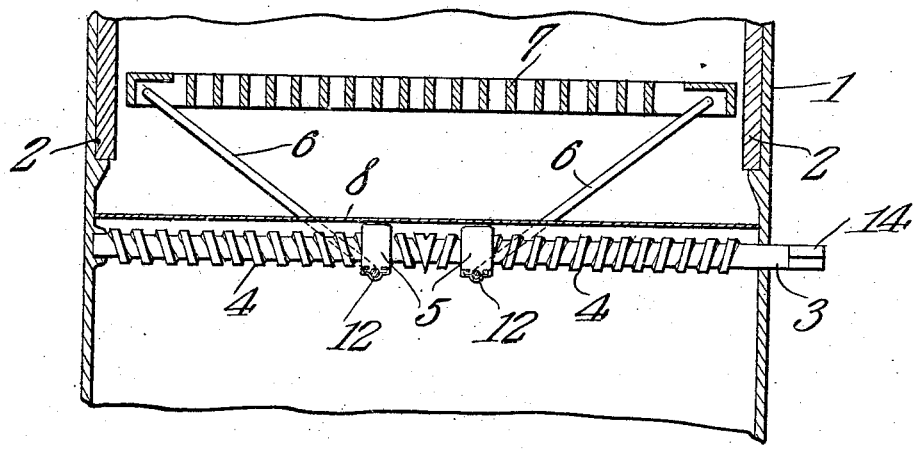
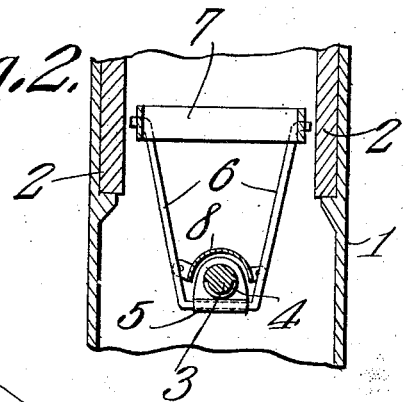
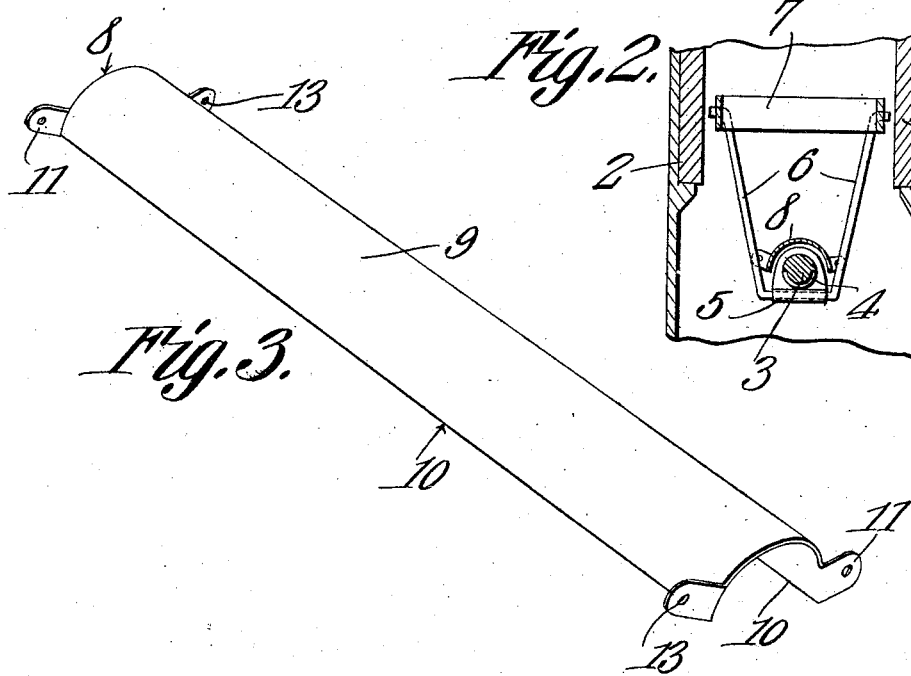
Witnesses
Robert E. Adams, Inventor
By C. A. Snow & Co., Attorneys

UNITED STATES PATENT OFFICE.

ROBERT E. ADAMS, OF MASON CITY, IOWA.

GRATE.

No. 928,921.　　　Specification of Letters Patent.　　　Patented July 27, 1909.

Application filed February 23, 1909. Serial No. 479,429.

*To all whom it may concern:*

Be it known that I, ROBERT E. ADAMS, a citizen of the United States, residing at Mason City, in the county of Cerro Gordo and State of Iowa, have invented a new and useful Grate, of which the following is a specification.

The device herein disclosed is adapted to be used in connection with stoves and furnaces having operating mechanism disposed beneath the grate and subject to disarrangement and injury through cinders and hot coals falling from the grate thereupon; and it consists in a screen or shield of novel and improved construction, designed to be interposed between the grate and such operating mechanism.

The present invention is intended as an improvement upon the grate shown and described in Letters Patent No. 868,631, issued on the 22nd day of October, 1907, to Robert E. Adams and Christ Hoffman.

The device is considered to be applicable to mechanisms other than that described in the hereinbefore mentioned Letters Patent, and it is not limited in its use to the particular disposition shown, it being understood that within the scope of what is hereinafter claimed, divers changes in the form, proportions, size and minor details of the structure may be made without departing from the spirit or sacrificing any of the advantages of the invention.

Similar numerals of reference are employed to denote corresponding parts throughout the several figures of the drawings.

In the accompanying drawings:—Figure 1 shows my invention in vertical longitudinal section; Fig. 2 is a vertical transverse section thereof; Fig. 3 is a detail perspective of the shield.

In the accompanying drawings, the numeral 1 denotes the casing of a stove, the same being provided upon its interior with suitable fire-brick 2, to form a fire-pot. A shaft 3 is terminally journaled for rotation in the casing 1 and is provided with right and left hand threads 4. Nuts 5 are shown arranged to travel the right and left hand threads 4 of the shaft 3 when the said shaft 3 is rotated, U-shaped arms 6 being hinged, as denoted by the numeral 12, to the nuts 5. The terminals of the U-shaped arms 6 are pivoted in a grate 7, which may be of any form, the simple construction of grate delineated being merely one embodiment of the invention. I further provide a shield 8, designed to be interposed between the grate 7 and the shaft 3, and this shield 8 is formed with a curved top 9, the edges 10 of the said shield being carried downward upon the sides of the nuts 5, in order to suitably house the same and the shaft 3. In its preferred form the shield 8 is fashioned from a single piece of metal, and it is provided with laterally extending arms 11 having suitable apertures 13, designed to receive bolts or like means, whereby the said shield 8 may be assembled with the casing 1.

As shown clearly in Fig. 2, the cinder shield is rolled upon the arc of a circle of which the axis of the shaft is the center to form a trough, the trough thus formed being inverted over the operating shaft, the edges of the trough being disposed substantially in a common horizontal plane with the axis of the shaft. By giving the trough a circular contour and by disposing its edges as herein before pointed out, the said trough is adapted to receive the falling cinders and to dispel them laterally upon either side of the operating shaft. When the shield is fashioned and mounted as herein-before pointed out the cinders will fall directly to the bottom of the ash pan, the contour of the shield being such that the cinders will not be thrown laterally with sufficient force to cause them to contact with the casing, and to fall between the casing and the ash-pan.

In practical operation, a crank is attached to the polygonal end 14 of the shaft 3, and, as the shaft is rotated thereby, the nuts 5 will be separated or drawn together, depending upon the direction of rotation of the shaft 3. As the nuts 5 are thus separated or drawn together the grate 7 will be raised or lowered, the depth of the fire-box being thereby adjusted.

It will be seen that, when any cinders or hot coals fall through the grate 7 they will be received by the curved top 9 of the shield 8 and carried downward over the edges 10 thereof, the shaft 3 being thereby protected from injury, and the threads 4 thereof being maintained in a cleanly condition.

Having thus described my invention, what I claim as new, and desire to protect, by Letters Patent, is:—

The combination with a heater casing, of a grate disposed within the casing; a shaft for operating the grate, journaled for rotation in the casing and disposed beneath the grate; a shield in the form of an inverted trough, interposed between the grate and the shaft; the shield being terminally provided upon either side, with laterally extending tongues disposed in the planes of the walls of the casing, the tongues being provided with apertures arranged to receive means whereby the shield may be assembled with the casing; the shield being rolled upon an arc of which the axis of the shaft is the center, and having its lower edges brought substantially into a common horizontal plane with the axis of the shaft.

In testimony that I claim the foregoing as my own, I have hereto affixed my signature in the presence of two witnesses.

ROBERT E. ADAMS.

Witnesses:
C. H. SMITH,
JAMES E. BLYTHE.